US006641872B2

(12) United States Patent
Kubo et al.

(10) Patent No.: US 6,641,872 B2
(45) Date of Patent: Nov. 4, 2003

(54) LIQUID CRYSTAL COMPOSITION AND LIQUID CRYSTAL DISPLAY ELEMENT

(75) Inventors: Yasuhiro Kubo, Chiba (JP); Kanetsugu Terashima, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 51 days.

(21) Appl. No.: 09/985,812

(22) Filed: Nov. 6, 2001

(65) Prior Publication Data

US 2002/0119261 A1 Aug. 29, 2002

(30) Foreign Application Priority Data

Nov. 20, 2000 (JP) ....................................... 2000-353261

(51) Int. Cl.$^7$ ......................... C09K 19/34; C09K 19/30
(52) U.S. Cl. ............... 428/1.1; 252/299.61; 252/299.63
(58) Field of Search ....................... 252/299.61, 299.63; 428/1.1

(56) References Cited

U.S. PATENT DOCUMENTS

| | | | | |
|---|---|---|---|---|
| 4,737,311 A | | 4/1988 | Scheuble et al. | 252/299.61 |
| 5,709,820 A | * | 1/1998 | Kato et al. | 252/299.61 |
| 5,714,087 A | | 2/1998 | Pausch et al. | 252/299.01 |

FOREIGN PATENT DOCUMENTS

| | | |
|---|---|---|
| DE | 197 20 295 | 12/1997 |
| DE | 197 20 296 | 12/1997 |
| EP | 0 747 336 | 12/1996 |
| GB | 2 310 669 | 9/1997 |
| WO | 98/32721 | 7/1998 |

* cited by examiner

*Primary Examiner*—Shean C. Wu
(74) *Attorney, Agent, or Firm*—Wenderoth, Lind & Ponack, L.L.P.

(57) ABSTRACT

A liquid crystal composition comprising component I consisting of at least one compound represented by formula (I) and component II consisting at least one compound selected from a group of compounds represented by formulas (II-1) to (II-7):

(I)

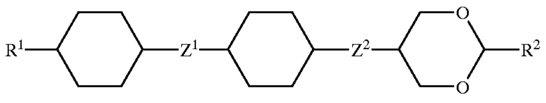

-continued (II-1)

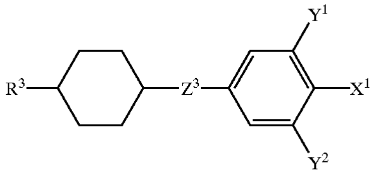

(II-2)

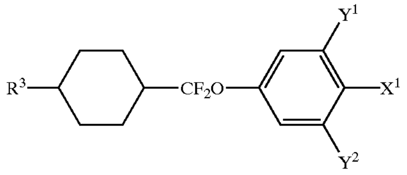

(II-3)

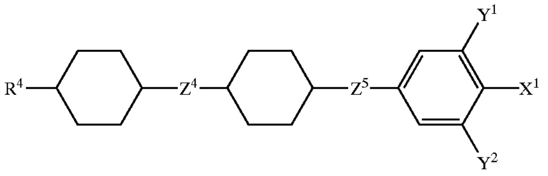

(II-4)

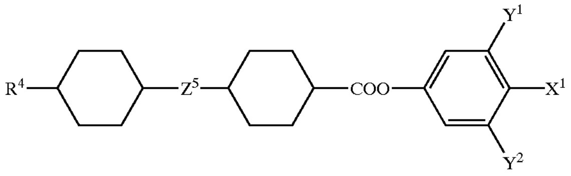

(II-5)

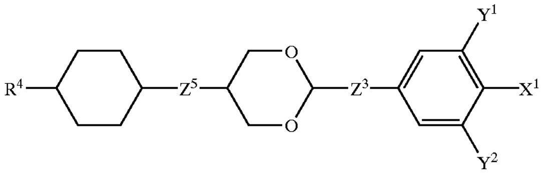

(II-6)

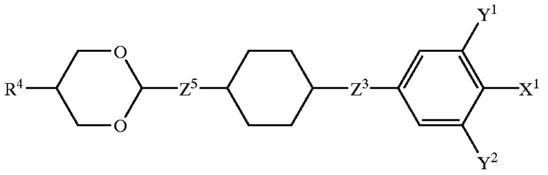

(II-7)

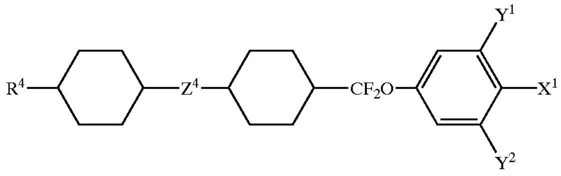

wherein each symbol in the formulas (I) to (II-7) is represented in the specification.

12 Claims, No Drawings

LIQUID CRYSTAL COMPOSITION AND LIQUID CRYSTAL DISPLAY ELEMENT

TECHNICAL FIELD

The present invention relates to a nematic liquid crystal composition. More specifically, it relates to a liquid crystal composition for an active matrix liquid crystal display element and the liquid crystal display element comprising the liquid crystal composition.

BACKGROUND ART

Transmission type active matrix liquid crystal display elements (AM-LCD) using a back-light as a light source have been practically utilized as elements being possible to display in full color. The back-light has the disadvantage that the consumption of electric power is large. Digital still cameras and digital video cameras having such AM-LCD are disadvantaged by the fact that they can not be used for extended periods.

Reflection type AM-LCD has been developed to solve the problem associated with the consumption of electric power. As light passes through liquid crystal layers two times, the reflection type AM-LCD requires a small value product of (Δn×d), where (d) is the thickness of the liquid crystal layers and (Δn) is the optical anisotropy in the liquid crystals. This fact was reported in the SID '97, Digest/643 by S. T. Wu, C. S. Wu and C. L. Kuo et al. The liquid crystals in a conventional transmission-TN type AM-LCD required Δn of about 0.075 to 0.120. However, the liquid crystals in a reflection-TN type AM-LCD requires Δn of 0.75 and less.

The physical properties required the reflection type AM-LCD except Δn are similar to those required for the transmission type AM-LCD, and are the following.

(a) a high specific resistance value and a high voltage holding ratio in order to increase the contrast of the LCD.

(b) a wide temperature range of a nematic phase in order to enable the LCD to be used in an outdoor environment. Namely, the upper temperature limit of the nematic phase is high and the lower temperature limit of the nematic phase is low.

(c) low threshold voltage in order to reduce the electric power consumption.

(d) low viscosity in order to increase response speed of the LCD.

The Japanese Patent Applications of JP 11-29771 A, JP 10-245559 A, JP 9-255956 A, and JP 9-249881 A can be cited as examples of literature that discloses liquid crystal compounds or liquid crystal compositions usable in AM-LCD's. However, the liquid crystal compositions disclosed in these documents have disadvantages such that Δn is large, the lower temperature limit of a nematic phase is high although Δn is relatively small, or the voltage holding ratio is low, as is made clear in the Comparative Examples of the present application. Consequently, the compositions were not suitable for the reflection-TN type AM-LCD use.

An object of the present invention is to provide a liquid crystal composition that satisfies the general physical properties required for an AM-LCD, and especially that the upper temperature limit of the nematic phase is high, the lower temperature limit of the nematic phase is low, and the Δn value is small.

DETAILED DESCRIPTION

Having carefully studied compositions comprising a variety of liquid crystal compounds in order to solve the problems referred to above, the applicants discovered that the problems could be overcome by developing a composition comprising the following components.

(1) A liquid crystal composition comprising component I that consists of at least one compound represented by formula (I), and component II that consists of at least one compound selected from a group of compounds represented by formulas (II-1) to (II-7).

(I)

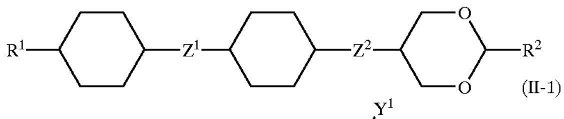

(II-1)

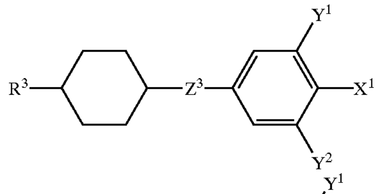

(II-2)

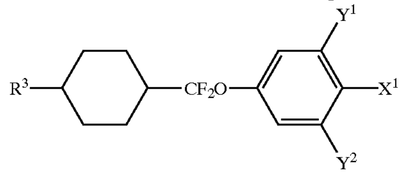

(II-3)

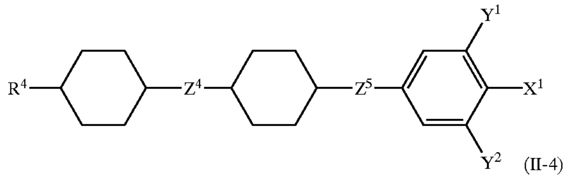

(II-4)

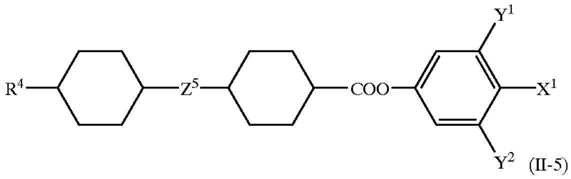

(II-5)

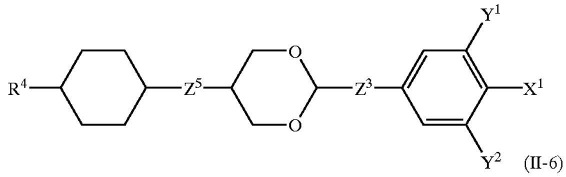

(II-6)

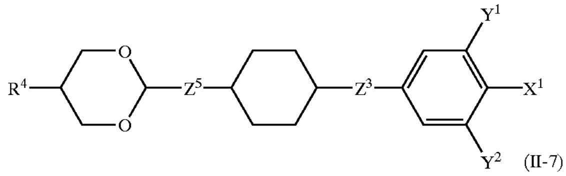

(II-7)

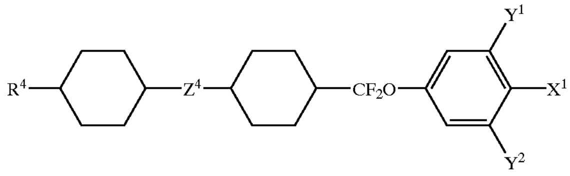

wherein $R^1$, $R^2$, $R^3$, and $R^4$ each independently represent alkyl, alkoxy or alkoxymethyl having 1 to 10 carbon, or alkenyl having 2 to 10 carbon; $Z^1$ and $Z^2$ each independently represent a single bond or —$C_2H_4$—; $Z^3$ represents a single bond, —$C_2H_4$— or —COO—; $Z^4$ represents a single bond, —$C_2H_4$— or —CH═CH—; $Z^5$ represents a single bond or —$C_2H_4$—; $X^1$ represents fluorine, chlorine, $CF_3$, $OCF_2H$, or $OCF_3$; and $Y^1$ and $Y^2$ each independently represent hydrogen or fluorine.

(2) The liquid crystal composition according to (1), wherein it comprises from 5% to 30% by weight of component I, based on the total weight of the composition, and from 35% to 95% by weight of component II, based on the total weight of the composition.

(3) The liquid crystal composition according to (1) or (2), wherein it comprises component I, component II and component III, and component III consists of at least one compound selected from a group of compounds represented by formulas (III-1) to (III-5).

(III-1)

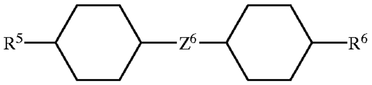

(III-2)

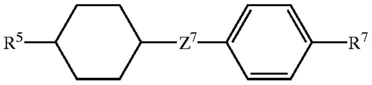

(III-3)

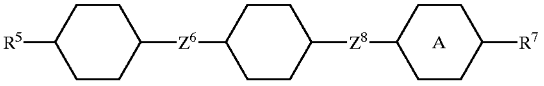

(III-4)

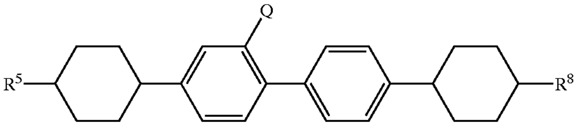

(III-5)

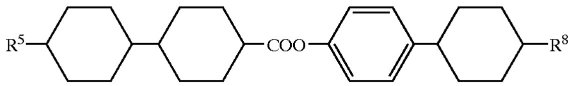

wherein $R^5$ and $R^8$ each independently represent alkyl, alkoxy or alkoxymethyl having 1 to 10 carbon, or alkenyl having 2 to 10 carbon; $R^6$ represents alkyl, alkoxy or alkoxymethyl having 1 to 10 carbon, alkenyl having 2 to 10 carbon, or —COO—$R^9$, $R^9$ represents alkyl having 1 to 10 carbon; $R^7$ represents alkyl or alkoxy having 1 to 10 carbon, alkenyl having 2 to 10 carbon, or fluorine; ring A represents 1,4-phenylene or 1,4-cyclohexylene; $Z^6$ and $Z^8$ each independently represent a single bond, —$C_2H_4$—, —COO—, or —CH═CH—; $Z^7$ represents a single bond, —$C_2H_4$— or —COO—; and Q represents hydrogen or fluorine.

(4) The liquid crystal composition according to (3), wherein it comprises from 5% to 30% by weight of component I, based on the total weight of the composition, from 35% to 90% by weight of component II, based on the total weight of the composition, and from 5% to 60% by weight of component III, based on the total weight of the composition.

(5) The liquid crystal display element comprising the liquid crystal composition according to (1), (2), (3), or (4).

Component I in the liquid crystal composition of the present invention consists of at least one compound selected from the group represented by formula (I) described above. Component I has an optical anisotropy (Δn) value in the range from 0.06 to 0.09, a clearing point (Tc) in the range from about 170 to 200° C., and a dielectric anisotropy (Δ∈) value of about zero, and is excellent in thermal stability, chemical stability and miscibility. Thus, component I is used mainly for maintaining a high Tc and reducing the Δn in liquid crystal compositions for a thin film transistors (TFT) mode which require high reliability. However, the composition prepared using only these compounds may have an overly narrow temperature range of a nematic phase and too high threshold voltage.

The preferred compounds for component I are the following:

(I-1)

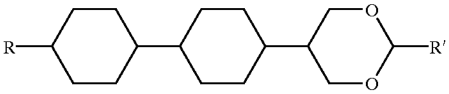

(I-2)

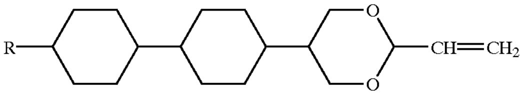

(I-3)

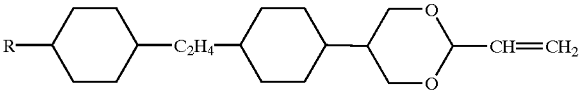

(I-4)

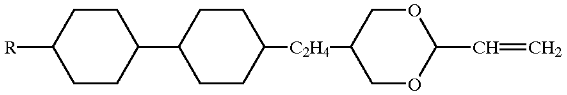

(I-5)

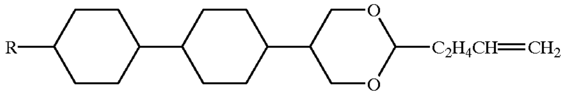

(I-6)

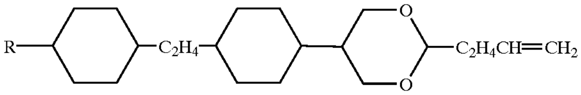

(I-7)

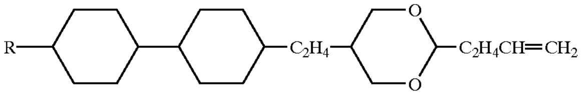

(I-8)

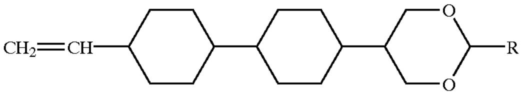

(I-9)

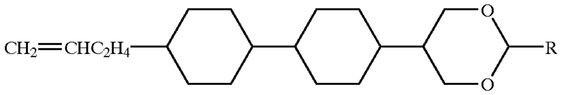

(I-10)

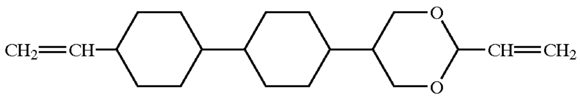

(I-11)

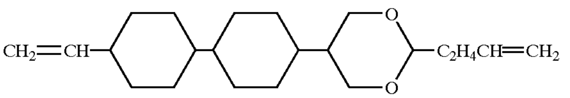

-continued (I-12)

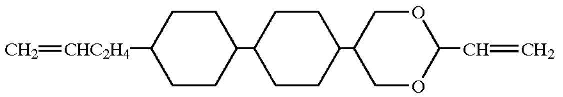

(I-13)

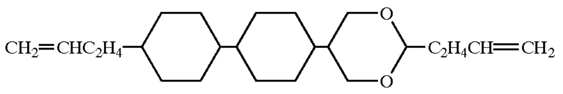

wherein R and R' each independently represent alkyl, alkoxy and alkoxymethyl having 1 to 10 carbon.

Component II consists of at least one compound selected from a group of compounds represented by formulas (II-1) to (II-7) described above. Component II has a Tc in the range of about −50 to 160° C., $\Delta\epsilon$ in the range of about 5 to 12, and $\Delta n$ in the range of about 0.03 to 0.12, and is excellent in thermal stability, chemical stability, and miscibility. Thus, component II plays a role especially in lowering threshold voltage in the liquid crystal composition for thin film transistors (TFT) mode which requires high reliability. However, the composition prepared by using only these compounds may have a tendency towards lowering the miscibility of the composition and may increase both the $\Delta n$ and the viscosity.

The preferred compounds for component II are the following:

(II-1-1)

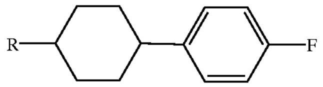

(II-1-2)

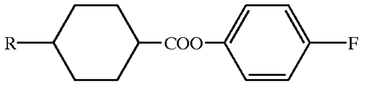

(II-1-3)

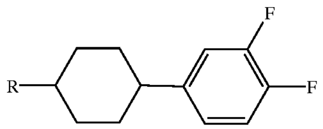

(II-1-4)

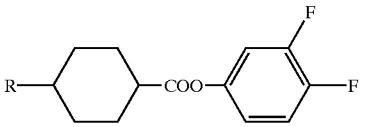

(II-1-5)

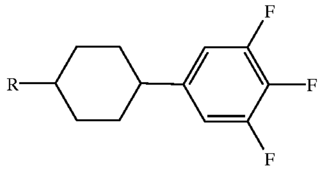

(II-1-6)

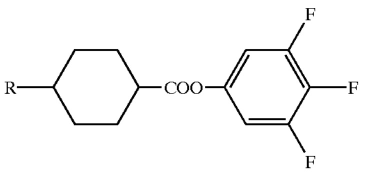

-continued (II-1-7)

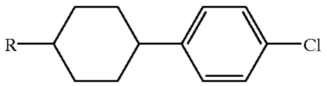

(II-1-8)

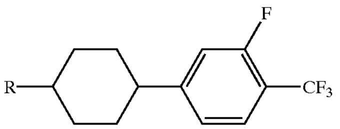

(II-1-9)

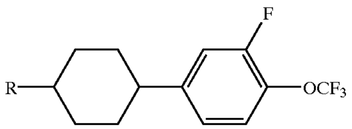

(II-1-10)

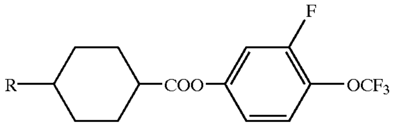

(II-1-11)

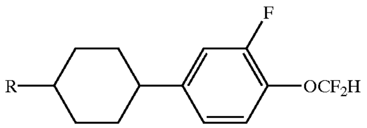

(II-1-12)

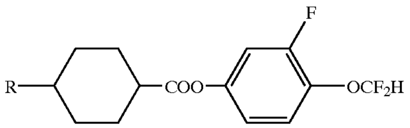

(II-1-13)

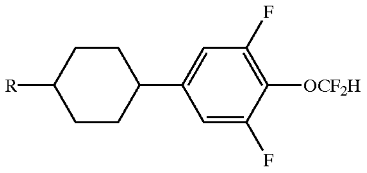

(II-1-14)

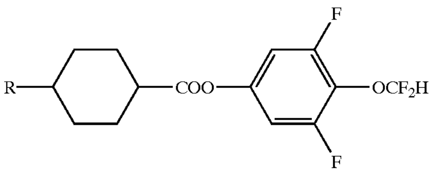

(II-2-1)

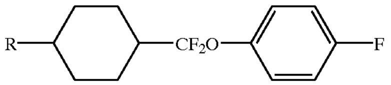

(II-2-2)

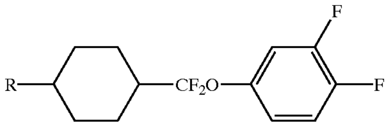

(II-2-3)

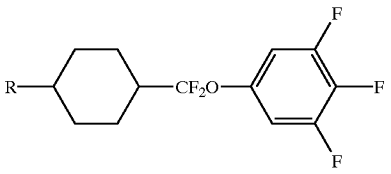

-continued
(II-2-4)
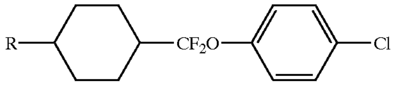
(II-2-5)
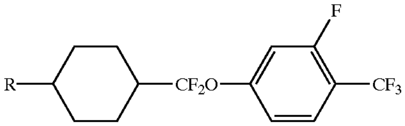
(II-2-6)
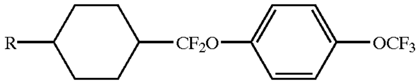
(II-2-7)
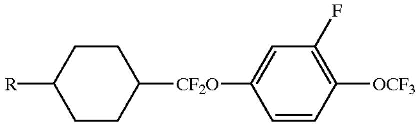
(II-2-8)
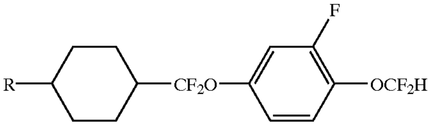
(II-2-9)
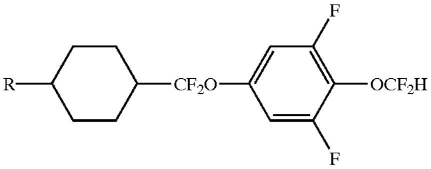
(II-3-1)
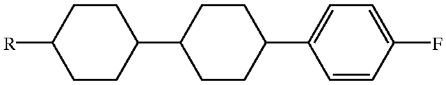
(II-3-2)
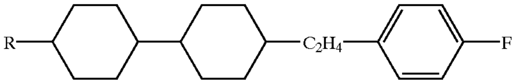
(II-3-3)
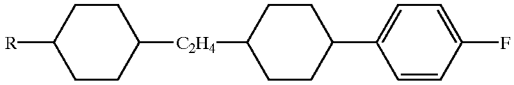
(II-3-4)
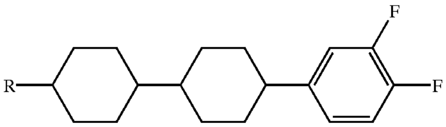
(II-3-5)
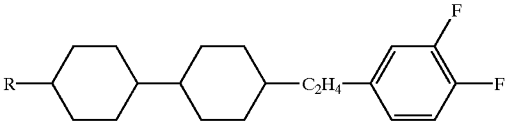
(II-3-6)
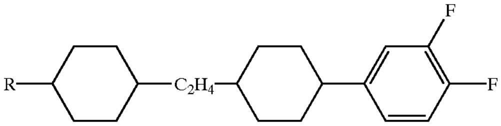
-continued
(II-3-7)
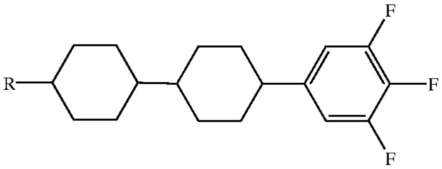
(II-3-8)
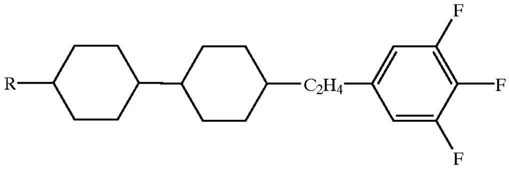
(II-3-9)
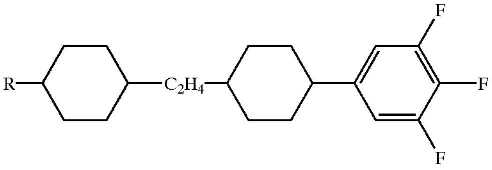
(II-3-10)
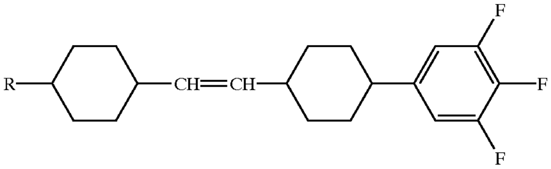
(II-3-11)
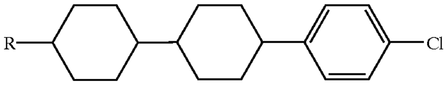
(II-3-12)
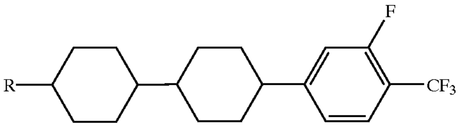
(II-3-13)
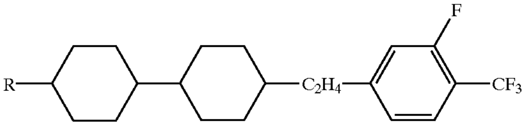
(II-3-14)
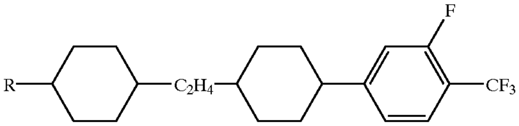
(II-3-15)
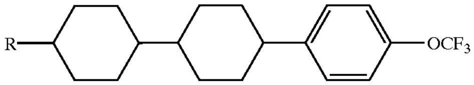
(II-3-16)
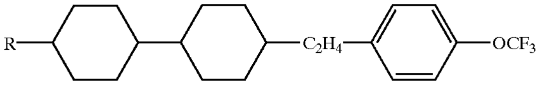

-continued
(II-3-17)
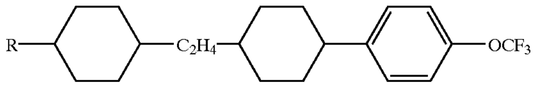
(II-3-18)
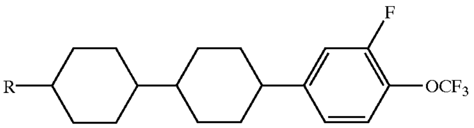
(II-3-19)
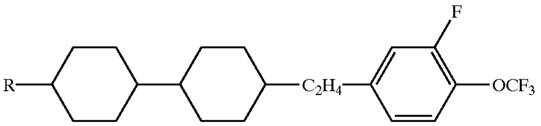
(II-3-20)
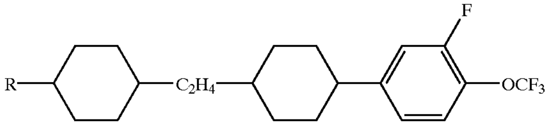
(II-3-21)
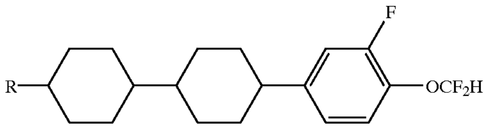
(II-3-22)
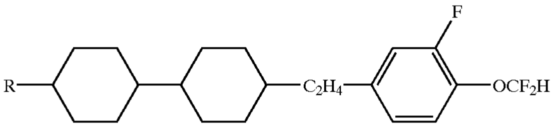
(II-3-23)
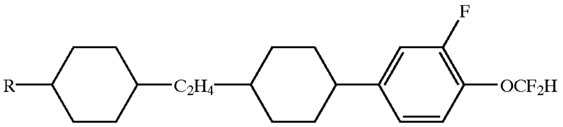
(II-3-24)
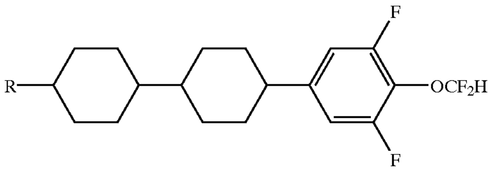
(II-3-25)
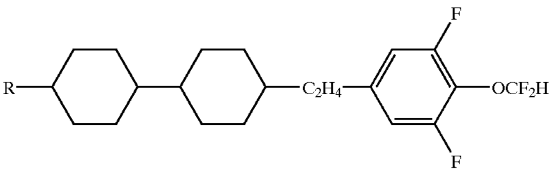
-continued
(II-3-26)
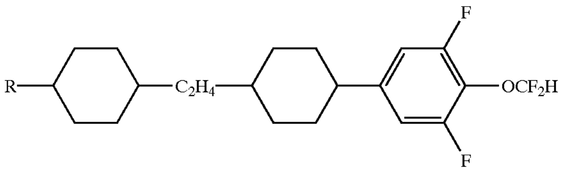
(II-4-1)
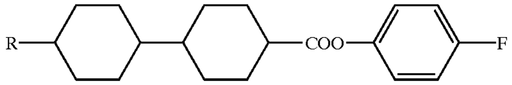
(II-4-2)
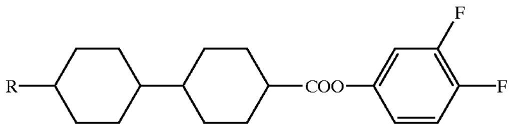
(II-4-3)
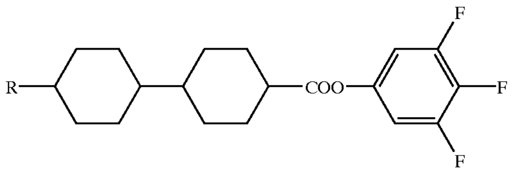
(II-4-4)
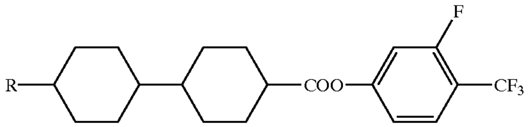
(II-4-5)
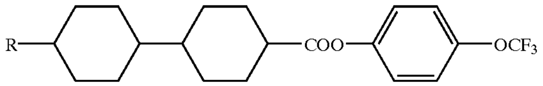
(II-4-6)
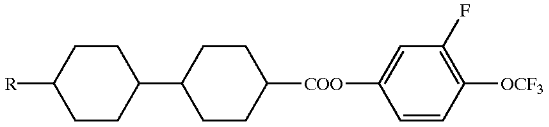
(II-4-7)
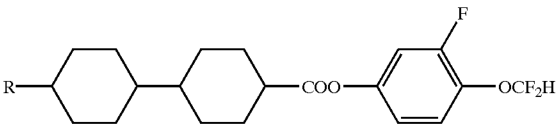
(II-4-8)
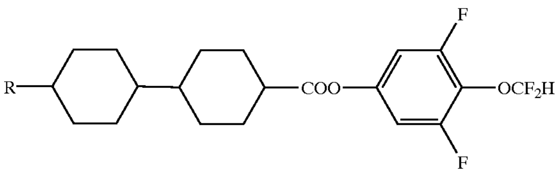
(II-5-1)
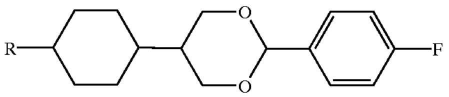

-continued
(II-5-2)
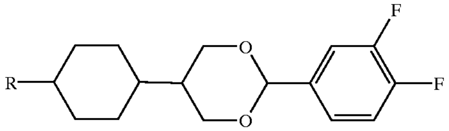
(II-5-3)
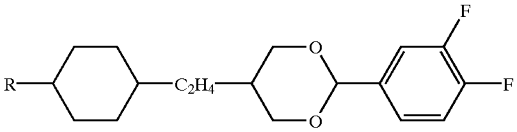
(II-5-4)
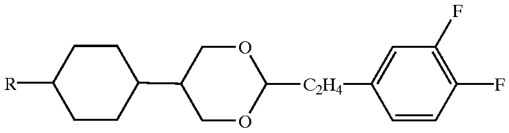
(II-5-5)
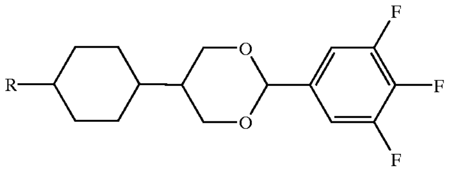
(II-5-6)
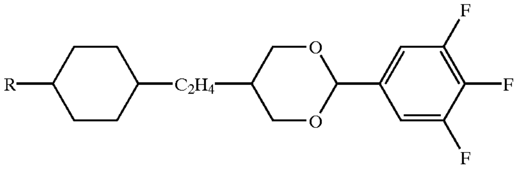
(II-5-7)
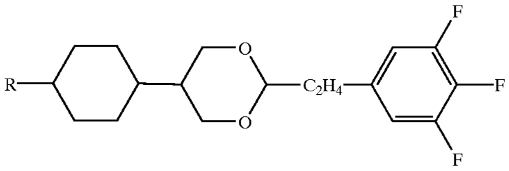
(II-5-8)
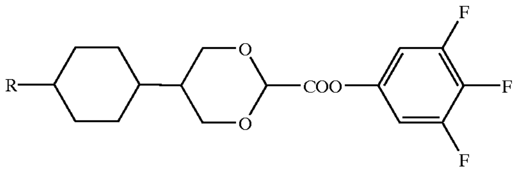
(II-5-9)
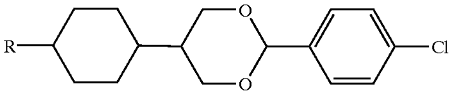
(II-5-10)
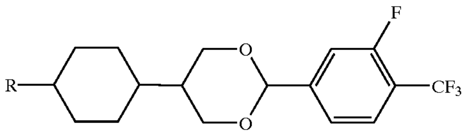
(II-5-11)
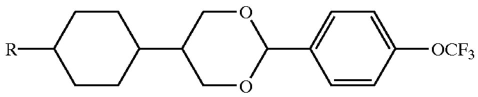
-continued
(II-5-12)
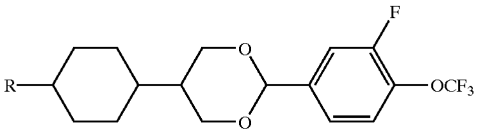
(II-5-13)
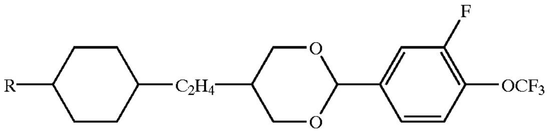
(II-5-14)
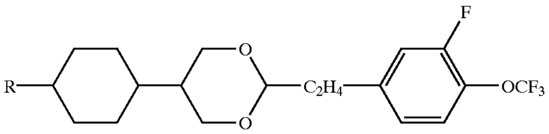
(II-5-15)
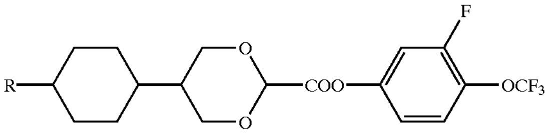
(II-5-16)
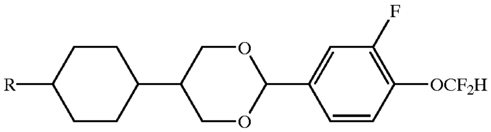
(II-5-17)
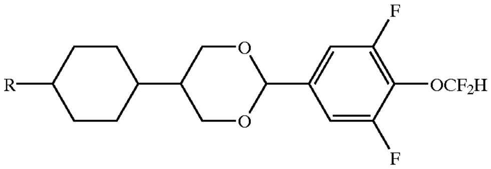
(II-6-1)
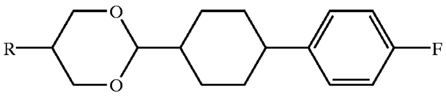
(II-6-2)
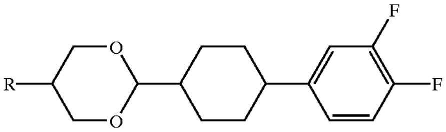
(II-6-3)
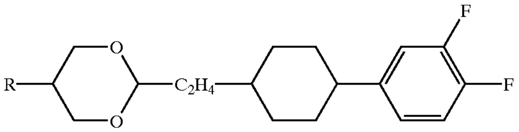
(II-6-4)
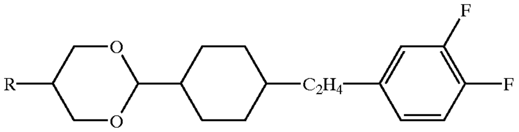

-continued
(II-6-5)
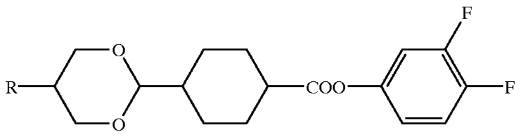
(II-6-6)
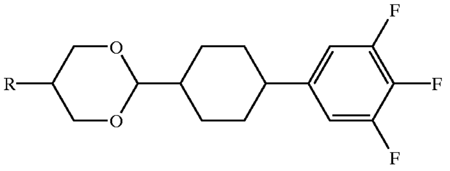
(II-6-7)
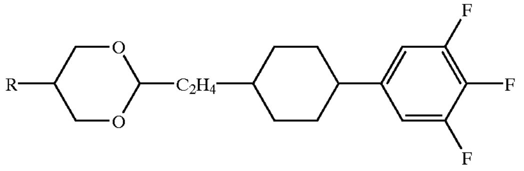
(II-6-8)
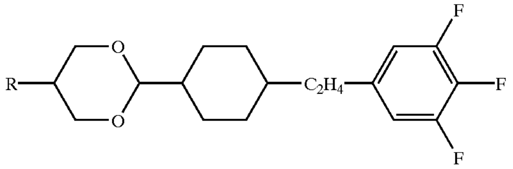
(II-6-9)
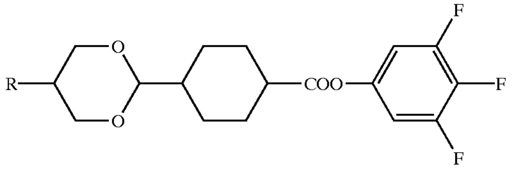
(II-6-10)
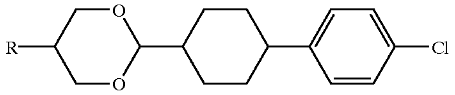
(II-6-11)
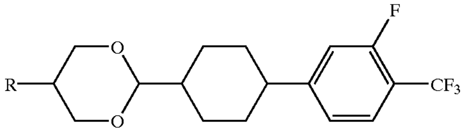
(II-6-12)
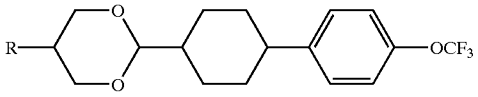
(II-6-13)
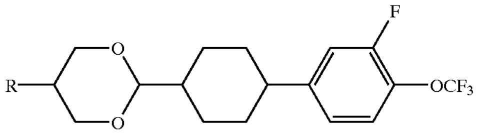
(II-6-14)
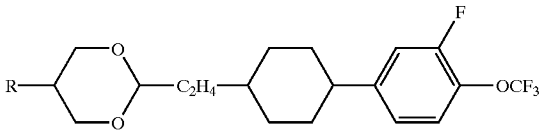
-continued
(II-6-15)
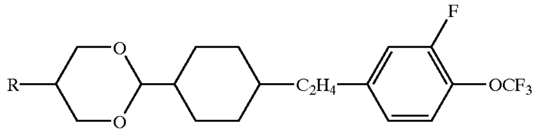
(II-6-16)
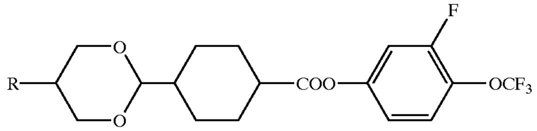
(II-6-17)
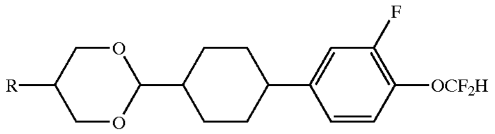
(II-6-18)
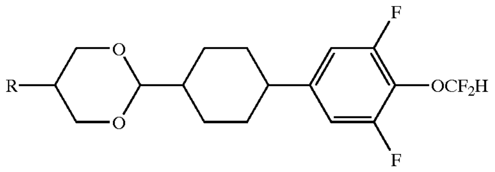
(II-7-1)
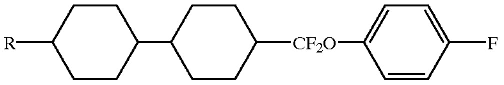
(II-7-2)
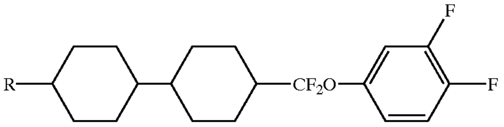
(II-7-3)
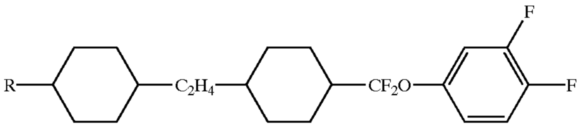
(II-7-4)
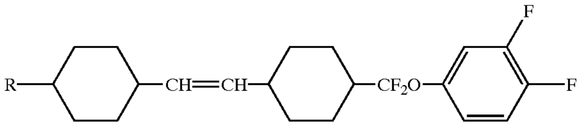
(II-7-5)
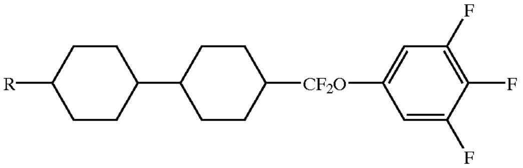

-continued (II-7-6)

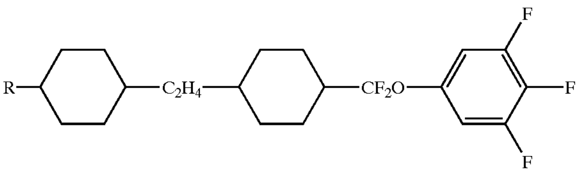

(II-7-7)

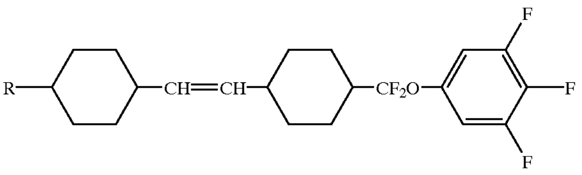

(II-7-8)

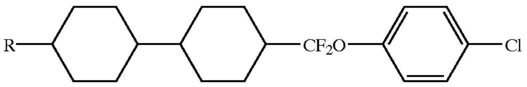

(II-7-9)

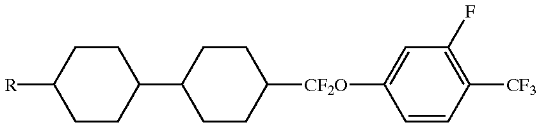

(II-7-10)

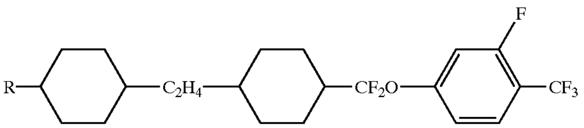

(II-7-11)

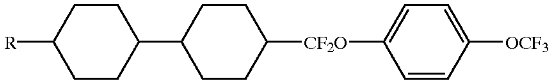

(II-7-12)

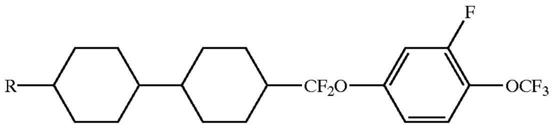

(II-7-13)

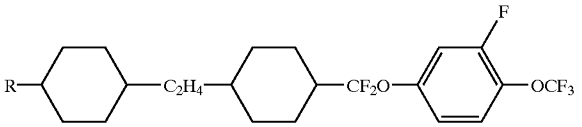

(II-7-14)

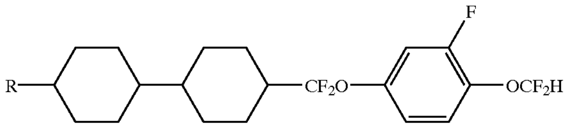

(II-7-15)

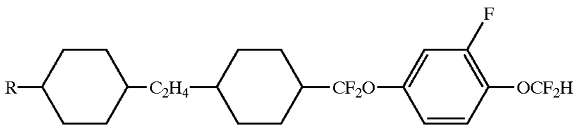

-continued (II-7-16)

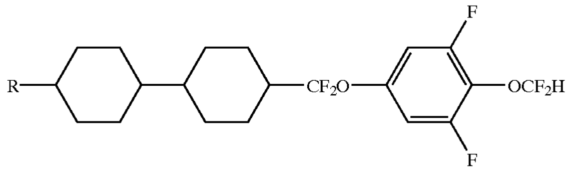

wherein R represents alkyl, alkoxy or alkoxymethyl having 1 to 10 carbon, or alkenyl having 2 to 10 carbon.

Especially preferred compounds in formula (II-1) are formulas (II-1-3) to (II-1-7). Especially preferred compounds in formula (II-2) are formulas (II-2-2) and (II-2-3). Especially preferred compounds in formula (II-3) are formula (II-3-1), (II-3-4), (II-3-6) to (II-3-9), and (II-3-11). Especially preferred compounds in formula (II-4) are formulas (II-4-1) to (II-4-3). Especially preferred compounds in formula (II-5) are formulas (II-5-5) and (II-5-6). Especially preferred compounds in formula (II-6) are formulas (II-6-2), (II-6-4) to (II-6-6), (II-6-8), and (II-6-9). Especially preferred compounds in formula (II-7) are formulas (II-7-2), (II-7-5), (II-7-8), (II-7-9), and (II-7-12).

In the liquid crystal composition of the present invention, the liquid crystal composition for an AM-LCD having small Δn, low viscosity, and a wide nematic phase can be prepared by any combination of component I and component II. The content of component I is preferably 5% to 30% by weight based on the total weight of the composition. More preferably, the content is 10% to 25% by weight. Less than 5% by weight may increase the Δn of the liquid crystal composition and more than 30% by weight tends to lower the miscibility of the liquid crystal composition at low temperatures.

The content of component II is preferably 35% to 95% by weight based on the total weight of the composition. More preferably, the content is 40% to 90% by weight. Less than 35% by weight may overly increase the threshold voltage of the composition, and more than 95% by weight may increase the viscosity and increase the Δn of the liquid crystal composition.

In the liquid crystal composition of the present invention, the composition containing component I and component II can be further combined with component III. Component III consists of at least one compound selected from the group represented by formulas (III-1) to (III-5) described above. The compounds represented by formula (III-1) and the compounds represented by formula (III-2) have a Tc in the range of about 10 to 70° C., Δ∈ of almost zero, and Δn in the range of about 0.02 to 0.06. The compounds represented by formula (III-3) have a Tc in the range of about 100 to 190° C., Δ∈ in the range of about 0 to 2, and Δ n in the range of about 0.07 to 0.10. The compounds represented by formula (III-4) and the compounds represented by formula (III-5) have a Tc in the range of about 220 to 260° C., Δ∈ of almost zero, and Δn in the range of about 0.12 to 0.16. The compounds represented by formulas (III-1) to (III-5) are excellent in thermal stability, chemical stability and miscibility. Therefore, component III has a Tc in the range of about 10 to 260° C., Δ∈ in the range from 0 to 2, and Δn in the range of about 0.02 to 0.16, and is excellent in thermal stability, chemical stability and miscibility. Given that component III has these physical properties, it is used to increase the Tc and to reduce the viscosity of the composition. However, a composition prepared using only by component III may overly increase threshold voltage.

The preferred compounds for component III are the following:
(III-1-1)
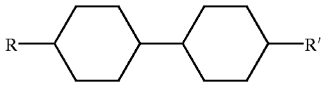
(III-1-2)
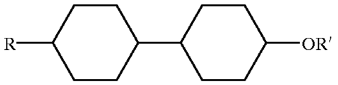
(III-1-3)
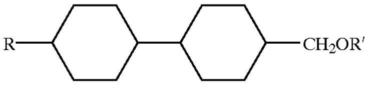
(III-1-4)
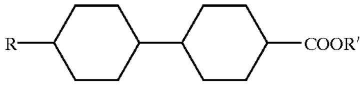
(III-1-5)
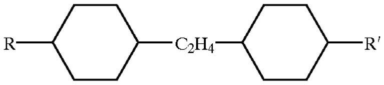
(III-1-6)
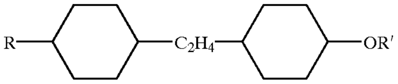
(III-1-7)
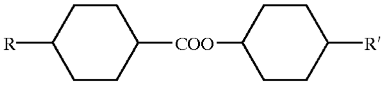
(III-1-8)
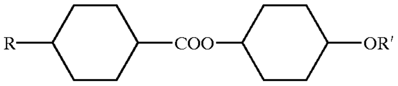
(III-1-9)
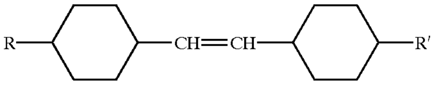
(III-1-10)
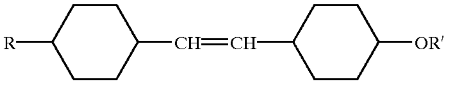
(III-2-1)
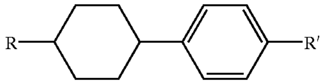
(III-2-2)
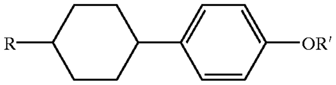
(III-2-3)
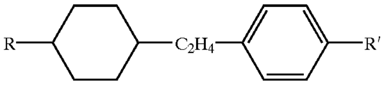
(III-2-4)
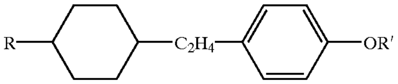
(III-2-5)
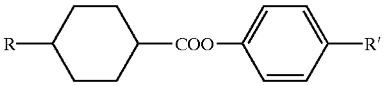
(III-2-6)
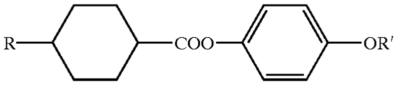
-continued
(III-3-1)
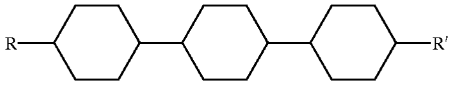
(III-3-2)
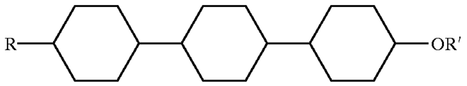
(III-3-3)
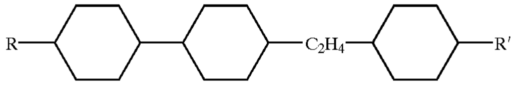
(III-3-4)
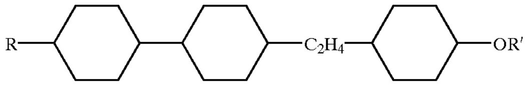
(III-3-5)
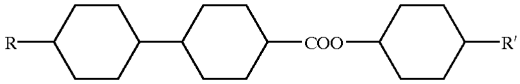
(III-3-6)
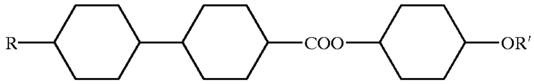
(III-3-7)
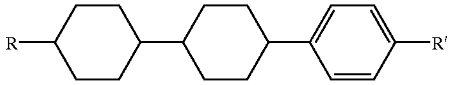
(III-3-8)
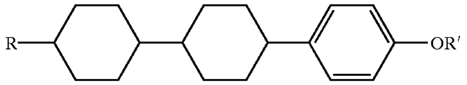
(III-3-9)
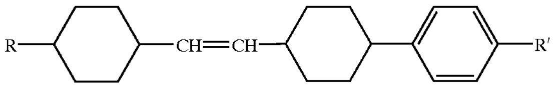
(III-3-10)
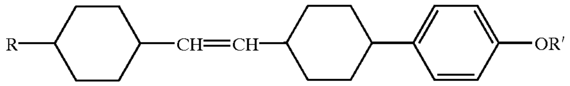
(III-4-1)
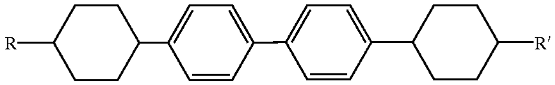
(III-4-2)
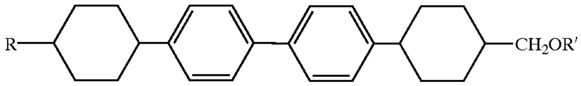
(III-4-3)
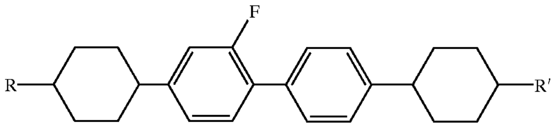
(III-5-1)
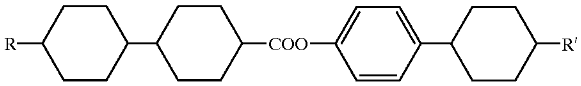

-continued (III-5-2)

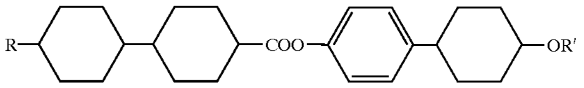

wherein R represents alkyl, alkoxy or alkoxymethyl having 1 to 10 carbon, or alkenyl having 2 to 10 carbon, and R' represent alkyl having 1 to 10 carbon.

The content of component III is preferably 5% to 60% by weight based on the total weight of the composition. More preferably, the content is 10% to 55% by weight. Less than 5% by weight tends to lower the miscibility and more than 60% by weight may increase the threshold voltage of the liquid crystal composition.

Next, the physical properties possessed by the composition of the present invention are explained in detail. Displays using a liquid crystal composition where the upper temperature limit of the nematic phase is lower than 70° C. and the lower temperature limit of the nematic phase is higher than −20° C., have environmental temperature limitations that restrict where and under what conditions they may be used. Such displays may not function correctly when used outdoors. Accordingly, the nematic phase range of the liquid crystal composition is preferably 70° C. or more for the upper temperature limit and −20° C. and less for the lower temperature limit. When using a the liquid crystal composition having Δn of more than 0.075 which is measured at 25° C., and wavelength of 589 nm, the white display of a reflection type AM-LCD may take on a yellow appearance. For this reason, the optical anisotropy value of the liquid crystal composition used is preferably 0.075 and less.

The compounds serving as components of the liquid crystal composition of the present invention can be prepared by known methods. For example, a synthetic method is described in the U.S. Pat. No. 5,709,820. The Japanese Patent Application JP 2-233626 A describes a synthetic method on the compounds (II-1-6), (II-3-7), (II-4-3), (II-5-5), and (II-6-6). The Japanese Patent Application JP 10-204016 A describes a synthetic method on the compounds (II-2-3) and (II-7-5). The Japanese Patent Applications JP 59-70624 A and JP 60-16940 A describe a synthetic method on the compound (III-1-1). The Japanese Patent Application JP 57-165328 A describes a synthetic method on the compound (III-3-7). The Japanese Patent JP 62-46527 B describes a synthetic method on the compound (III-4-1). This clearly shows that each compound of the components in the liquid crystal composition of the present invention can be prepared by these synthetic methods, or by the application of these synthetic methods.

The liquid crystal composition of the present invention can be prepared by conventional methods. Generally, compounds are mixed and then dissolved with each other at high temperatures. A chiral dopant such as choresteric nonanoate may be added to the liquid crystal composition of the present invention for the purpose of controlling the twist angle, by inducing a helical structure in the liquid crystal molecules. The liquid crystal composition of the present invention can be used in the guest-host mode by adding a dichroic dye such as merocyanine type, styryl type, azo type, azomethine type, azoxy type, quinophthalone type, anthraquinone type or tetrazine type dye. It can be used for a polymer dispersed liquid crystal display device or in the birefringence controlling mode or the dynamic scattering mode. It can also be used for a liquid crystal display with an in-plain switching mode.

The following embodiments of the present invention are given by way of example only and should not be seen to be a limitation on the present invention in any way. Percentage (%) showing the ratio of the composition, represents the % by weight, and the compounds are represented by the symbols defined in Table 1.

TABLE 1

Symbol for representing compounds
R—($A_1$)—$Z_1$—...—$Z_n$—($A_n$)—X

| 1) Left end group R— | Code | 3) Bond group —$Z_n$— | Code |
|---|---|---|---|
| $C_nH_{2n+1}$— | n— | —$C_2H_4$— | 2 |
| $C_nH_{2n+1}O$— | nO— | —$C_4H_8$— | 4 |
| $C_nH_{2n+1}OC_mH_{2m+1}$— | nOm— | —COO— | E |
| $CH_2$=CH— | V— | —C≡C— | T |
| $CH_2$=$CHC_nH_{2n}$— | Vn— | —CH=CH— | V |
| $C_nH_{2n+1}CH$=$CHC_mH_{2m}$— | nVm— | —$CF_2O$— | CF2O |
| $C_nH_{2n+1}CH$=$CHC_mH_{2m}CH$=$CHC_kH_{2k}$— | nVmVk— | —$OCF_2$— | OCF2 |
| $CF_2$=CH— | VFF— | | |
| $CF_2$=$CHC_nH_{2n}$— | VFFn— | | |
| **2) Cyclic structure —($A_n$)—** | **Code** | **4) Right end group —X** | **Code** |
|  | B | —F<br>—Cl<br>—CN<br>—$CF_3$ | —F<br>—CL<br>—C<br>—CF3 |
| 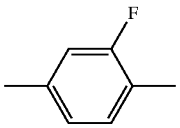 | B(F) | —$OCF_3$<br>—$OCF_2H$<br>—$C_nH_{2n+1}$ | —OCF3<br>—OCF2H<br>—n |

TABLE 1-continued

| Symbol for representing compounds $R—(A_1)—Z_1—\ldots—Z_n—(A_n)—X$ | | | |
|---|---|---|---|
| 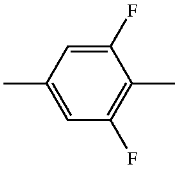 | B(F, F) | $—OC_nH_{2n+1}$<br>$—COOCH_3$<br>$—C_nH_{2n}CH{=}CH_2$ | —On<br>—EMe<br>—nV |
| 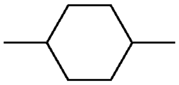 | H | $—C_mH_{2m}CH{=}CHC_nH_{2n+1}$<br>$—CH{=}CF_2$<br>$—C_nH_{2n}CH{=}CF_2$ | —mVn<br>—VFF<br>—nVFF |
| 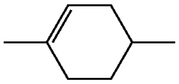 | Ch | $—C{\equiv}C—CN$ | —TC |
| 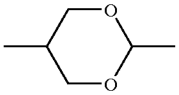 | G | | |
| 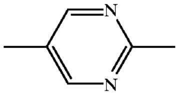 | Py | | |

5) Description examples

Example 1 3-H2B(F, F)B(F)—F

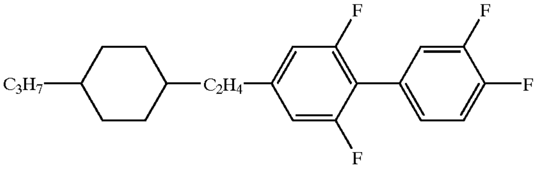

Example 3 3-GHEB(F, F)—F

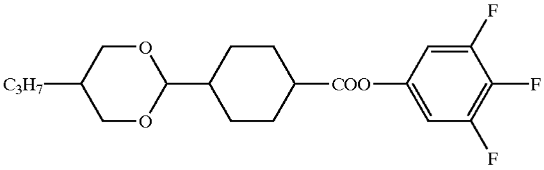

Example 2 5-HHG—V

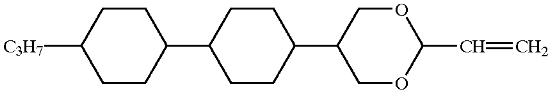

In terms of physical properties of the liquid crystal composition, Tc is the clearing point, TL is the lower temperature limit of a nematic phase, Δn is optical anisotropy at 25° C., Δ∈ is dielectric anisotropy at 25° C., and η is viscosity at 20° C. TL was assessed in relation to the liquid crystal phase after storing the composition for 30 days in freezers at 0° C., −10° C., −20° C., −30° C., and −40° C. For example, the TL of a liquid crystal composition was represented as "<−20° C." when the composition was in a nematic state at −20° C. but was crystallized at −30° C. Δn was measured using a lamp having a wavelength of 589 nm as a light source. Vth was obtained by measuring the value of the impressed threshold voltage, when the transmission ratio of light passing through a cell was 90%, and wherein the cell had a cell thickness (0.4/Δn) μm and 80° of twist angle and was impressed with rectangular waves having a frequency of 32 Hz in the normally white mode.

Comparative Example 1

Following the preparation of a liquid crystal composition as described in Example 32 of the Japanese Patent Application JP 60-231789 A, its physical properties were measured.

| | |
|---|---|
| 3-HB-C | 11.0% |
| 4-HB-C | 10.0% |
| 2-GH-5 | 18.0% |
| 3-GH-O2 | 15.0% |
| 3-HHB-C | 5.0% |
| 5-HBB-C | 4.0% |
| 3-HEH-3 | 25.0% |
| 3-HHEH-3 | 6.0% |
| 3-HB(F)BH-3 | 6.0% |
| Tc = 60.6° C. | |
| TL < −10° C. | |
| Δn = 0.093 | |
| η = 19.2 mPa · s | |
| Vth = 2.91 V | |

In this composition, the Tc point is low and Δn is large.

Comparative Example 2

Following the preparation of a liquid crystal composition as described in Example 2 of the Japanese Patent Application JP 9-249881 A, its physical properties were measured.

| | |
|---|---|
| 7-HB-F | 8.0% |
| 3-HB-O2 | 5.0% |
| 3-HH-O1 | 12.0% |
| 3-HH-5 | 5.0% |
| 2-HHB-OCF3 | 7.0% |
| 3-HHB-OCF3 | 8.0% |
| 4-HHB-OCF3 | 7.0% |
| 5-HHB-OCF3 | 8.0% |
| 2-HBB(F)-F | 3.0% |
| 3-HBB(F)-F | 4.0% |
| 3-HH2B(F)-F | 7.0% |
| 5-HH2B(F)-F | 8.0% |
| 2-HHB(F, F)-F | 6.0% |
| 3-HHB(F, F)-F | 6.0% |
| 5-HHB(F, F)-F | 6.0% |
| Tc = 79.7° C. | |
| TL < 0° C. | |
| Δn = 0.076 | |
| η = 18.3 mPa · s | |
| Vth = 2.54 V | |

In this composition, the Tc point is low, TL is high, and Δn is large.

Comparative Example 3

Following the preparation of a liquid crystal composition as described in Use Example 6 of the PCT Application WO 98/32721 A, its physical properties were measured.

| | |
|---|---|
| 3-HG-V | 5.0% |
| 5-HG-V | 5.0% |
| 3-HEB-F | 11.5% |
| 5-HEB-F | 11.5% |
| 3-HH-EMe | 25.0% |
| 3-HHEB(F, F)-F | 5.0% |
| 3-HHEB-F | 5.0% |
| 5-HHEB-F | 5.0% |
| 2-HBB(F)-F | 5.5% |
| 3-HBB(F)-F | 5.5% |
| 5-HBB(F)-F | 11.0% |
| 3-HBB(F, F)-F | 5.0% |
| Tc = 71.2° C. | |
| TL < −20° C. | |
| Δn = 0.080 | |
| η = 20.6 mPa · s | |
| Vth = 2.38 V | |

In this composition, the Tc point is low and Δn is large.

EXAMPLE 1

The following liquid crystal composition was prepared.

| | |
|---|---|
| 3-HHG-V | 5.0% |
| 5-HHG-V | 5.0% |
| 7-HB(F, F)-F | 5.0% |
| 3-HHB(F, F)-F | 10.0% |
| 3-H2HB(F, F)-F | 10.0% |
| 4-H2HB(F, F)-F | 10.0% |
| 5-H2HB(F, F)-F | 10.0% |
| 3-HH2B(F, F)-F | 10.0% |
| 5-HH2B(F, F)-F | 7.0% |
| 3-HHEB(F, F)-F | 12.0% |
| 4-HHEB(F, F)-F | 3.0% |
| 5-HHEB(F, F)-F | 3.0% |
| 4-GHB(F, F)-F | 5.0% |
| 5-GHB(F, F)-F | 5.0% |

Physical properties of this composition are as follows.

Tc=91.0° C.

TL<−20° C.

Δn=0.073

η=35.8 mPa·s

Vth=1.58 V

EXAMPLE 2

The following liquid crystal composition was prepared.

| | |
|---|---|
| V-HHG-2V | 10.0% |
| V2-HHG-V | 10.0% |
| 7-HB(F, F)-F | 5.0% |
| 3-HHB(F, F)-F | 10.0% |
| 3-HHCF2OB(F, F)-F | 10.0% |
| 4-HHCF2OB(F, F)-F | 10.0% |
| 5-HHCF2OB(F, F)-F | 10.0% |
| 3-HH2B(F, F)-F | 10.0% |
| 5-HH2B(F, F)-F | 7.0% |
| 3-HHEB(F, F)-F | 12.0% |
| 4-HHEB(F, F)-F | 3.0% |
| 5-HHEB(F, F)-F | 3.0% |

Physical properties of this composition are as follows.

Tc=107.5° C.

TL<−10° C.

Δn=0.074

η=34.1 mPa·s

Vth=1.69 V

EXAMPLE 3

The following liquid crystal composition was prepared.

| | |
|---|---|
| 5-HH2G-V | 12.0% |
| 3O-HHG-V | 7.0% |
| 3-HHG-2V | 6.0% |
| 3-HHEB(F, F)-F | 10.0% |
| 4-HHEB(F, F)-F | 3.0% |
| 5-HHEB(F, F)-F | 3.0% |
| 3-HGB(F, F)-F | 5.0% |
| 4-HGB(F, F)-F | 5.0% |
| 5-HGB(F, F)-F | 10.0% |
| 3-H2GB(F, F)-F | 6.0% |
| 5-GHB(F, F)-F | 9.0% |
| 3-HH-EMe | 13.0% |
| 5-HH-EMe | 11.0% |

Physical properties of this composition are as follows.

Tc=114.3° C.

TL<−10° C.

Δn=0.070

η=33.6 mPa·s

Vth=1.78 V

EXAMPLE 4

The following liquid crystal composition was prepared.

| | |
|---|---|
| 5-HHG-V | 6.0% |
| 7-HB(F)-F | 3.0% |
| 7-HB(F, F)-F | 9.0% |
| 2-HHB(F)-F | 10.0% |
| 3-HHB(F)-F | 10.0% |
| 5-HHB(F)-F | 10.0% |
| 3-H2HB(F, F)-F | 9.0% |
| 4-H2HB(F, F)-F | 9.0% |
| 5-H2HB(F, F)-F | 9.0% |
| 3-HHB(F, F)-F | 5.0% |
| 3-HH2B(F, F)-F | 10.0% |
| 5-HH2B(F, F)-F | 10.0% |

Physical properties of this composition are as follows.

Tc=83.3° C.

TL<−30° C.

Δn=0.069

η=24.5 mPa·s

Vth=1.68 V

EXAMPLE 5

The following liquid crystal composition was prepared.

| | |
|---|---|
| 3-H2HG-V | 5.0% |
| 2O-HHG-V | 4.0% |
| 5-HCF2OB(F, F)-F | 6.0% |
| 3-HCF2OB(F)-OCF3 | 3.0% |
| 3-H2HB(F, F)-F | 9.0% |
| 4-H2HB(F, F)-F | 9.0% |
| 5-H2HB(F, F)-F | 9.0% |
| 3-HHB(F, F)-F | 5.0% |
| 3-HH2B(F, F)-F | 10.0% |
| 5-HH2B(F, F)-F | 10.0% |
| 3-HHCF2OB(F)-F | 10.0% |
| 4-HHCF2OB(F)-F | 10.0% |
| 5-HHCF2OB(F)-F | 10.0% |

Physical properties of this composition are as follows.

Tc=96.4° C.

TL<−30° C.

Δn=0.070

η=26.2 mPa·s

Vth=1.33 V

EXAMPLE 6

The following liquid crystal composition was prepared.

| | |
|---|---|
| 2-HHG-V | 7.0% |
| V-HHG-V | 7.0% |
| 5-HEB(F, F)-F | 18.0% |
| 3-HHB(F, F)-F | 7.0% |
| 3-H2HB(F, F)-F | 10.0% |

-continued

| | |
|---|---|
| 4-H2HB(F, F)-F | 9.0% |
| 5-H2HB(F, F)-F | 10.0% |
| 3-HH2B(F, F)-F | 13.0% |
| 5-HH2B(F, F)-F | 3.0% |
| 3-HHEB(F, F)-F | 10.0% |
| 4-HHEB(F, F)-F | 3.0% |
| 5-HHEB(F, F)-F | 3.0% |

Physical properties of this composition are as follows.

Tc=86.0° C.

TL<−20° C.

Δn=0.071

η=27.2 mPa·s

Vth=1.56 V

EXAMPLE 7

The following liquid crystal composition was prepared.

| | |
|---|---|
| 3-HH2G-V | 7.0% |
| 5-HHG-V | 12.0% |
| 7-HB(F, F)-F | 9.0% |
| 4-H2HB(F, F)-F | 10.0% |
| 5-H2HB(F, F)-F | 10.0% |
| 3-HHCF2OB(F, F)-F | 10.0% |
| 4-HHCF2OB(F, F)-F | 10.0% |
| 3-HHCF2OB(F, F)-OCF2H | 17.0% |
| 5-HHCF2OB(F, F)-OCF2H | 15.0% |

Physical properties of this composition are as follows.

Tc=98.9° C.

TL<−30° C.

Δn=0.074

η=31.0 mPa·s

Vth=1.54 V

EXAMPLE 8

The following liquid crystal composition was prepared.

| | |
|---|---|
| 5-HHG-2V | 4.0% |
| 3O-H2HG-2V | 4.0% |
| V2-HHG-V | 4.0% |
| V2-HHG-2V | 4.0% |
| 7-HB(F)-F | 7.0% |
| 7-HB (F, F)-F | 9.0% |
| 3-H2HB (F, F)-F | 8.0% |
| 3-HHB (F, F)-F | 5.0% |
| 3-HH2B (F, F)-F | 7.0% |
| 5-HH2B (F, F)-F | 6.0% |
| 3-HHEB (F, F)-F | 11.0% |
| 5-HHEB (F, F)-F | 3.0% |
| 3-GHEB (F, F)-F | 3.0% |
| 5-GHEB (F, F)-F | 2.0% |
| 3-HHCF2OB (F)-OCF3 | 5.0% |
| 3-HHCF2OB (F) -OCF2H | 5.0% |
| 3-HHCF2OB (F) -CF3 | 5.0% |
| 3-HH-4 | 8.0% |

Physical properties of this composition, are as follows.

Tc=89.3° C.

TL<−30° C.

Δn=0.072

η=24.2 mPa·s

Vth=1.45 V

EXAMPLE 9

The following liquid crystal composition was prepared.

| | |
|---|---|
| 3-HHG-V | 5.0% |
| 3-HHEB (F, F)-F | 10.0% |
| 4-HHEB (F, F)-F | 3.0% |
| 5-HHEB (F, F)-F | 3.0% |
| 2-HGB (F, F)-F | 6.0% |
| 3-HGB (F, F)-F | 4.0% |
| 4-HGB (F, F)-F | 4.0% |
| 5-HGB (F, F)-F | 6.0% |
| 3-HB-O2 | 4.0% |
| 2-HH-EMe | 10.0% |
| 3-HH-EMe | 20.0% |
| 5-HH-EMe | 17.0% |
| 3-HHB-1 | 4.0% |
| 3-HHB-F | 4.0% |

Physical properties of this composition are as follows.

Tc=85.7° C.

TL<−20° C.

Δn=0.068

η=21.7 mPa·s

Vth=2.13 V

EXAMPLE 10

The following liquid crystal composition was prepared.

| | |
|---|---|
| V-HHG-V | 5.0% |
| V2-HHG-V | 5.0% |
| 3-HHEB (F, F)-F | 10.0% |
| 4-HHEB (F, F)-F | 3.0% |
| 5-HHEB (F, F)-F | 3.0% |
| 3-HHCF2OB (F)-F | 6.0% |
| 5-HHCF2OB (F)-F | 4.0% |
| 3-HHCF2OB (F, F)-F | 4.0% |
| 5-HHCF2OB (F, F)-F | 6.0% |
| 5-HCF2OB (F, F)-F | 4.0% |
| 2-HH-EMe | 10.0% |
| 3-HH-EMe | 20.0% |
| 5-HH-EMe | 15.0% |
| 3-HHEB-F | 5.0% |

Physical properties of this composition are as follows.

Tc=88.2° C.

TL<−30° C.

Δn=0.071

η=23.6 mPa·s

Vth=1.98 V

EXAMPLE 11

The following liquid crystal composition was prepared.

| | |
|---|---|
| 3-HH2G-V | 6.0% |
| 4-H2HG-V | 6.0% |
| 7-HB (F, F)-F | 5.0% |
| 3-HHB (F, F)-F | 10.0% |
| 3-H2HB (F, F)-F | 9.0% |
| 4-H2HB (F, F)-F | 9.0% |
| 5-H2HB (F, F)-F | 8.0% |
| 3-HHEB (F, F)-F | 10.0% |
| 4-HHEB (F, F)-F | 3.0% |
| 3-HGB (F, F)-F | 6.0% |

-continued

| | |
|---|---|
| 3-HH-4 | 10.0% |
| 3-HH-EMe | 6.0% |
| 5-HEB-F | 6.0% |
| 7-HEB-F | 6.0% |

Physical properties of this composition are as follows.

Tc=81.6° C.

TL<−30° C.

Δn=0.065

η=22.8 mPa·s

Vth=1.60 V

EXAMPLE 12

The following liquid crystal composition was prepared.

| | |
|---|---|
| 2-HHG-V | 5.0% |
| 3-HH2G-V | 5.0% |
| 3-HCF2OB (F)-OCF3 | 5.0% |
| 3-HHB (F)-OCF3 | 5.0% |
| 3-HHB (F, F)-OCF2H | 5.0% |
| 3-H2HB (F, F)-F | 9.0% |
| 4-H2HB (F, F)-F | 9.0% |
| 5-H2HB (F, F)-F | 8.0% |
| 3-HHEB (F, F)-F | 10.0% |
| 4-HHEB-OCF3 | 3.0% |
| 3-HGB (F, F)-F | 6.0% |
| 3-HH-4 | 8.0% |
| 3-HH-EMe | 5.0% |
| 7-HB-1 | 5.0% |
| 5-HEB-F | 6.0% |
| 5-HHEB-F | 6.0% |

Physical properties of this composition are as follows.

Tc=82.2° C.

TL<−20° C.

Δn=0.064

η=21.2 mPa·s

Vth=1.38 V

EXAMPLE 13

The following liquid crystal composition was prepared.

| | |
|---|---|
| 5-HHG-V | 6.0% |
| V2-HHG-V | 6.0% |
| 5-HB-CL | 5.0% |
| 4-HHB (F, F)-F | 10.0% |
| 3-H2HB (F, F)-F | 9.0% |
| 4-H2HB (F, F)-F | 9.0% |
| 5-H2HB (F, F)-F | 8.0% |
| 3-HHEB (F, F)-F | 10.0% |
| 3-HH-4 | 7.0% |
| 3-HEB-O2 | 8.0% |
| 3-HH-EMe | 8.0% |
| 5-HB-O2 | 8.0% |
| 5-HBBH-1O1 | 3.0% |
| 3-HHEBH-5 | 3.0% |

Physical properties of this composition are as follows.

Tc=83.5° C.

TL<−30° C.

Δn=0.069

η=24.0 mPa·s

Vth=1.72 V

What is claimed is:

1. A liquid crystal composition comprising component I that consists of at least one compound represented by formula (I), and component II that consists of at least one compound selected from a group of compounds represented by formulas (II-1) to (II-7).

(I)

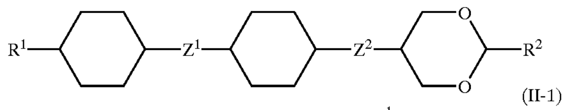

(II-1)

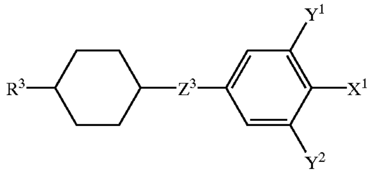

(II-2)

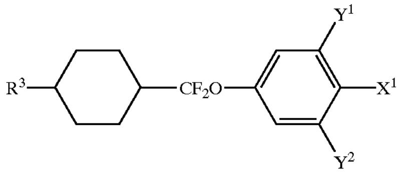

(II-3)

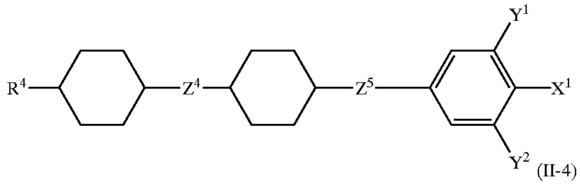

(II-4)

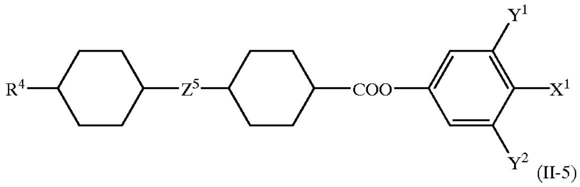

(II-5)

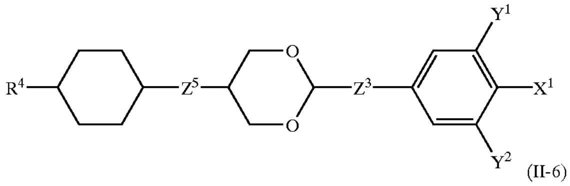

(II-6)

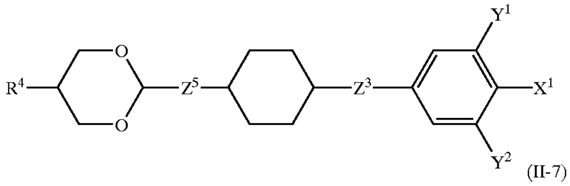

(II-7)

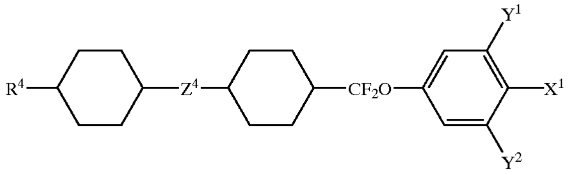

wherein $R^1$, $R^2$, $R^3$, and $R^4$ each independently represent alkyl, alkoxy or alkoxymethyl having 1 to 10 carbon, or alkenyl having 2 to 10 carbon; $Z^1$ and $Z^2$ each independently represent a single bond or —$C_2H_4$—; $Z^3$ represents a single bond, —$C_2H_4$— or —COO—; $Z^4$ represents a single bond, —$C_2H_4$— or —CH═CH—; $Z^5$ represents a single bond or —$C_2H_4$—; $X^1$ represents fluorine, chlorine, $CF_3$, $OCF_2H$, or $OCF_3$; and $Y^1$ and $y^2$ each independently represent hydrogen or fluorine.

2. The liquid crystal composition according to claim 1, wherein it comprises from 5% to 30% by weight of component I, based on the total weight of the composition, and from 35% to 95% by weight of component II, based on the total weight of the composition.

3. The liquid crystal composition according to claim 1, wherein it comprises component I, component II and component III, and component III consists of at least one compound selected from a group of compounds represented by formulas (111-1) to (111-5):

(III-1)

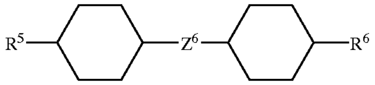

(III-2)

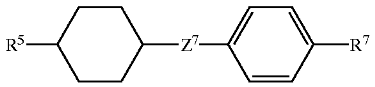

(III-3)

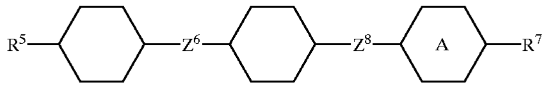

(III-4)

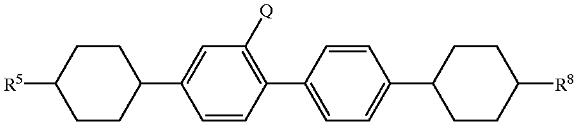

(III-5)

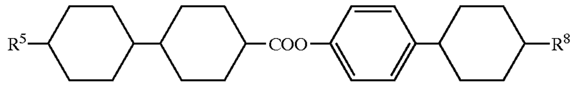

wherein $R^5$ and $R^8$ each independently represent alkyl, alkoxy or alkoxymethyl having 1 to 10 carbon, or alkenyl having 2 to 10 carbon; $R^6$ represents alkyl, alkoxy or alkoxymethyl having 1 to 10 carbon, alkenyl having 2 to 10 carbon, or —COO—$R^9$, $R^9$ represents alkyl having 1 to 10 carbon; $R^7$ represents alkyl or alkoxy having 1 to 10 carbon, alkenyl having 2 to 10 carbon, or fluorine; ring A represents 1,4-phenylene or 1,4-cyclohexylene; $Z^6$ and $Z^8$ each independently represent a single bond, —$C_2H_4$—, —COO—, or —CH═CH—; $Z^7$ represents a single bond, —$C_2H_4$— or —COO—; and Q represents hydrogen or fluorine.

4. The liquid crystal composition according to claim 3, wherein it comprises from 5% to 30% by weight of component I, based on the total weight of the composition, from 35% to 90% by weight of component II, based on the total weight of the composition, and from 5% to 60% by weight of component III, based on the total weight of the composition.

5. The liquid crystal display element comprising the liquid crystal composition according to claim 1.

6. The liquid crystal display element comprising the liquid crystal composition according to claim 3.

7. The liquid crystal composition according to claim 2, wherein it comprises component I, component II and component III, and component III consists of at least one compound selected from a group of compounds represented by formulas (111-1) to (111-5):

(III-1)

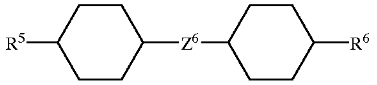

(III-2)

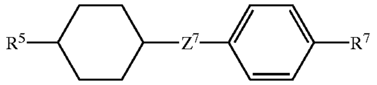

(III-3)

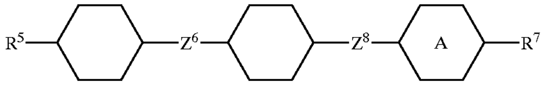

(III-4)

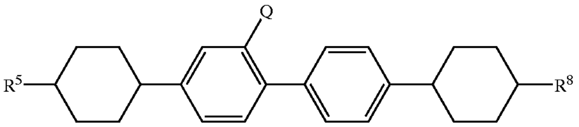

(III-5)

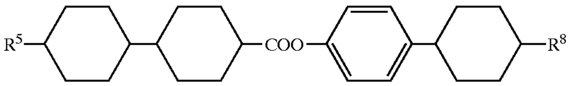

wherein $R^5$ and $R^8$ each independently represent alkyl, alkoxy or alkoxymethyl having 1 to 10 carbon, or alkenyl having 2 to 10 carbon; $R^6$ represents alkyl, alkoxy or alkoxymethyl having 1 to 10 carbon, alkenyl having 2 to 10 carbon, or —COO—$R^9$, $R^9$ represents alkyl having 1 to 10 carbon; $R^7$ represents alkyl or alkoxy having 1 to 10 carbon, alkenyl having 2 to 10 carbon, or fluorine; ring A represents 1,4-phenylene or 1,4-cyclohexylene; $Z^6$ and $Z^8$ each independently represent a single bond, —$C_2H_4$—, —COO—, or —CH═CH—; $Z^7$ represents a single bond, —$C_2H_4$— or —COO—; and Q represents hydrogen or fluorine.

8. The liquid crystal composition according to claim 7, wherein it comprises from 5% to 30% by weight of component I, based on the total weight of the composition, from 35% to 90% by weight of component II, based on the total weight of the composition, and from 5% to 60% by weight of component III, based on the total weight of the composition.

9. The liquid crystal display element comprising the liquid crystal composition according to claim 2.

10. The liquid crystal display element comprising the liquid crystal composition according to claim 4.

11. The liquid crystal display element comprising the liquid crystal composition according to claim 8.

12. The liquid crystal display element comprising the liquid crystal composition according to claim 7.

* * * * *